(12) United States Patent
Müller et al.

(10) Patent No.: US 7,690,065 B2
(45) Date of Patent: Apr. 6, 2010

(54) AIRCRAFT BOARDING BRIDGE OR AIRCRAFT BOARDING STAIRS

(75) Inventors: Michael Müller, Guxhagen (DE); Jens Karasek, Kaufungen (DE)

(73) Assignee: Hübner GmbH, Kassel (DE)

( * ) Notice: Subject to any disclaimer, the term of this patent is extended or adjusted under 35 U.S.C. 154(b) by 0 days.

(21) Appl. No.: 11/807,097

(22) Filed: May 29, 2007

(65) Prior Publication Data

US 2007/0289074 A1   Dec. 20, 2007

(30) Foreign Application Priority Data

Jun. 14, 2006   (DE) ............... 10 2006 027 568
Nov. 22, 2006   (DE) ............... 10 2006 054 910

(51) Int. Cl.
*E01D 1/00* (2006.01)
(52) U.S. Cl. .............................................. 14/71.5
(58) Field of Classification Search .......... 14/71.1, 14/71.3, 71.5
See application file for complete search history.

(56) References Cited

U.S. PATENT DOCUMENTS

| 3,703,737 | A | * | 11/1972 | Eggert, Jr. | ............ 14/71.5 |
| 4,112,958 | A | * | 9/1978 | Anderberg | ............ 14/71.5 |
| 4,553,720 | A | * | 11/1985 | Harder | ............ 244/137.2 |
| 4,817,223 | A | * | 4/1989 | Koch | ............ 14/71.1 |
| 6,802,096 | B2 | | 10/2004 | Savage | |
| 6,898,816 | B2 | * | 5/2005 | Tholen et al. | ............ 14/71.5 |
| 7,069,611 | B2 | * | 7/2006 | Larson | ............ 14/71.3 |

FOREIGN PATENT DOCUMENTS

| DE | 30 23 885 A1 | 1/1982 |
| DE | 33 06 109 C2 | 9/1983 |
| EP | 0 277 648 A1 | 8/1988 |

* cited by examiner

*Primary Examiner*—Gary S Hartmann
(74) *Attorney, Agent, or Firm*—Thomas R. Vigil

(57) ABSTRACT

The subject matter of the invention is an aircraft boarding bridge or aircraft boarding stairs with a gangway bottom plate (30), said aircraft boarding bridge or said aircraft boarding stairs comprising a bellows (1), more specifically a U-shaped bellows, that spans said gangway bottom plate, wherein the clear height (arrow 50) between the upper edge of the gangway bottom plate (30) and the roof of the bellows (1) may be varied.

10 Claims, 12 Drawing Sheets

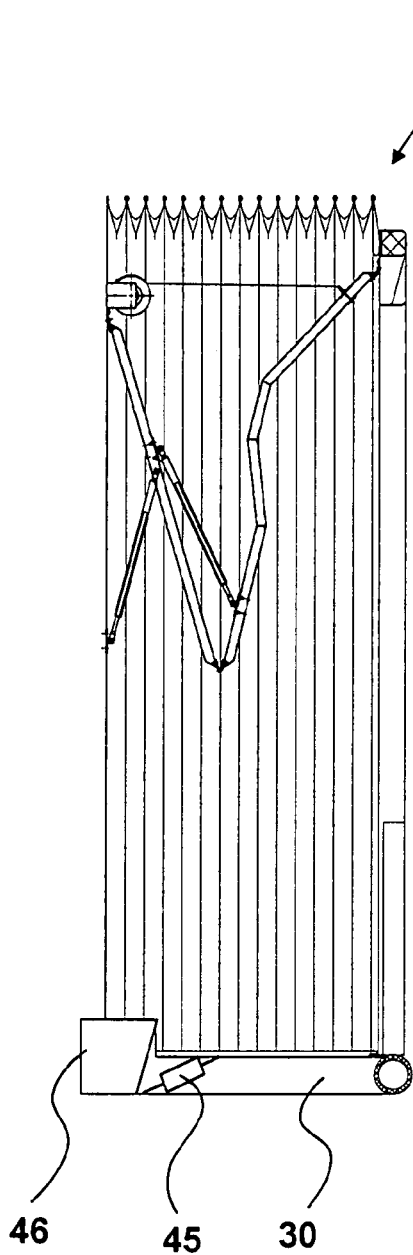
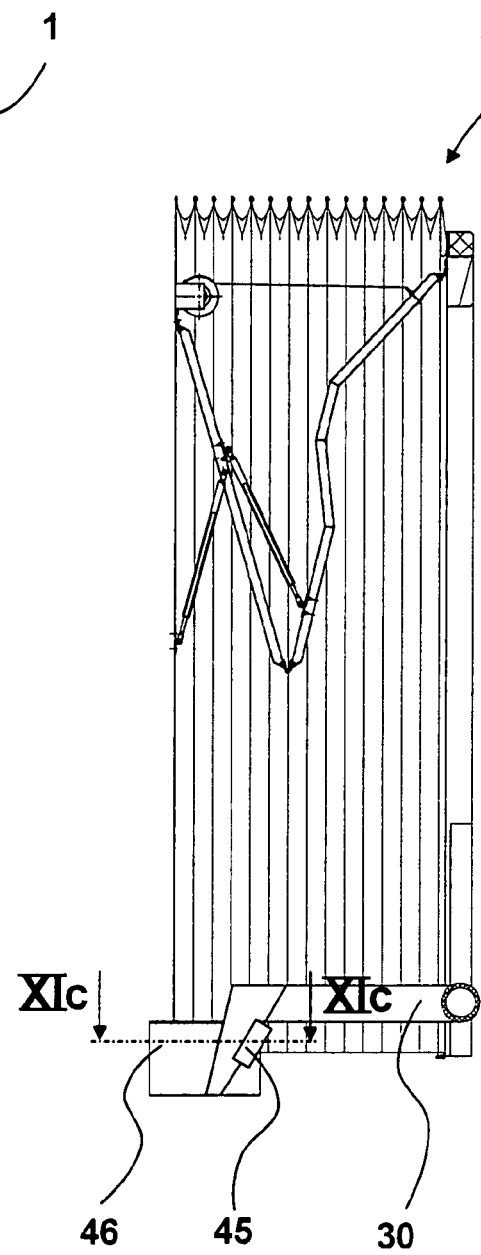
46    45    30    46    45    30
Fig. 11a    Fig. 11b
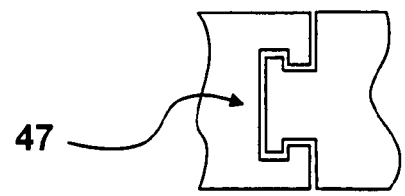
Fig. 11c

AIRCRAFT BOARDING BRIDGE OR AIRCRAFT BOARDING STAIRS

CROSS-REFERENCE TO RELATED APPLICATIONS

This appliction claims Priority from German Application No. DE 10 2006 027 568.3 filed on 14 Jun. 2006

1. Field of the Invention

The present invention relates to an aircraft boarding bridge or to aircraft boarding stairs with a gangway bottom plate, said aircraft boarding bridge or said aircraft boarding stairs comprising a bellows, more specifically a U-shaped bellows, that spans said gangway bottom plate.

2. Description of the Prior Art

Aircraft boarding stairs or aircraft boarding bridges are well known, for example from DE 30 23 885 A1, EP 0 277 648 A1 and DE 33 06 109 C2. These aircraft boarding stairs or aircraft boarding bridges serve for boarding a plane. Such type aircraft boarding stairs or boarding bridges have an extendable bellows that spans the space between the aircraft boarding stairs or the aircraft boarding bridge and the aircraft in order to protect from weather passengers boarding the plane. The bellows is of a substantially U-configuration type, with the bellows being closed at its bottom by the bottom plate of a gangway. At its end side, the bellows comprises a flexible frame with a shock buffer made from a resilient elastic material, said bellows resting at this shock buffer on the outer skin of the aircraft. The flexibility of the frame is needed insofar as the frame must ensure that the aircraft boarding bridge or the aircraft boarding stairs snugly conform to the shape of the aircraft fuselage. A rigid frame would not be able to do so. The shock buffer is intended to prevent the outer skin of the aircraft from being damaged when the flexible frame is fit thereagainst.

Such type aircraft boarding stairs or aircraft boarding bridges are intended to ensure access to the most varied types of aircrafts. This means that such aircraft boarding stairs or aircraft boarding bridges are intended to ensure access to a small machine and to an Airbus A380 alike. The Airbus has upper access doors that extend into the roof of the aircraft fuselage. This means that the bellows of such an aircraft boarding bridge or aircraft boarding stairs must have a very large dimension in height since, due to the outer contour of the door opening, the entire door opening can be completely encompassed only with such a very high bellows.

On the other side, as already discussed above, there are aircrafts the access door of which extends substantially only over the vertical part of the aircraft fuselage. Here, a large vertical dimension is a hindrance since the shock buffer could then extend beyond the zenith of the aircraft. As a result, the shock buffer would not fit the entire surface in the upper region so that there is a risk of water penetration. Another hazard is damage to roof structures such as antennae, sensors, etc., on aircrafts having a small fuselage diameter. Moreover, the arm deflecting the bellows would come into direct contact with the aircraft fuselage.

BRIEF SUMMARY OF THE INVENTION

In order to allow for wide application of such aircraft boarding stairs or aircraft boarding bridges, which are quite expensive to acquire, meaning both on small and on large aircrafts, it is suggested, in accordance with the invention, that the clear height between the upper edge of the gangway bottom plate and the roof of the bellows be variable. If such aircraft boarding stairs or such an aircraft boarding bridge is to be utilized at the upper boarding access to an A380, the width of the opening needs to be large. In this case, the selected clear height between the upper edge of the gangway bottom plate and the roof of the bellows needs to be very large whilst if the bridge is intended to allow access to a small aircraft, in which the door opening is substantially located in the vertical region of the aircraft fuselage and in which the bellows is not intended to project substantially beyond the contour of the door, the clear height of the bellows needs only to be small. It appears therefrom that an aircraft boarding bridge or aircraft boarding stairs in which the clear height between the upper edge of the gangway bottom plate and the roof of the bellows is variable is much more versatile.

More specifically, there is provided that the aircraft boarding stairs or the aircraft boarding bridge comprises a frame apparatus that receives the bellows for height adjustment relative to the gangway bottom plate. This means that the gangway bottom plate remains fixed, that only the bellows moves in the vertical direction relative to the gangway bottom plate so as to widen or reduce the clear width of the opening. In this context, there is more specifically provided that the frame apparatus comprises two relatively movable frame parts, said two frame parts being connected together through longitudinal guides such as Rollon® guides. It appears therefrom that the frame part, which is located on the aircraft boarding bridge or on the aircraft boarding stairs, is fixedly disposed there, whilst the other movable frame part, which receives the bellows, is movable in height, thus providing the required variability in the clear height of the passage. In this context, there is provided that the one frame part is movable relative to the other frame part through a motor drive, a spindle drive for example. Said spindle drive is more specifically disposed on the two long sides of the aircraft boarding stairs or of the aircraft boarding bridge.

In order to prevent moisture from penetrating between the two relatively movable frame parts of the frame apparatus, a ceiling cloth covering the gap between the two frame parts is stretched over the two frame parts at the upper horizontal struts. The length of the ceiling cloth corresponds to the maximum distance the frame parts can move relative to each other in the vertical direction.

It may also be envisaged that the gangway bottom plate be height-adjustable. In this case, there is provided that the U-shaped bellows is connected to the aircraft boarding bridge or the aircraft boarding stairs through a coupling frame. The gangway bottom plate is hereby movable in height through a motor drive such as a spindle or piston-and-cylinder drive disposed on the coupling frame. If the gangway bottom plate is height-adjustable relative to the bottom of the aircraft boarding bridge, a step forcibly forms between the gangway bottom plate on the one side and the bottom of the aircraft boarding stairs or the aircraft boarding bridge on the other side, which can be levelled with a bridging member. Such a bridging member forms a ramp over the step for wheelchair users for example to negotiate this step.

The invention will be explained in closer detail herein after with reference to the drawings.

BRIEF SUMMARY OF THE DRAWING

FIG. 11a shows an aircraft boarding bridge with a height adjustable gangway bottom plate in a bottom position;

FIG. 11b shows an illustration according to FIG. 11a, the gangway bottom plate being now in the top position;

FIG. 11c shows a view taken along the section line XIb/XIb in FIG. 11b.

DETAILED DESCRIPTION OF THE INVENTION

Figure 1A:
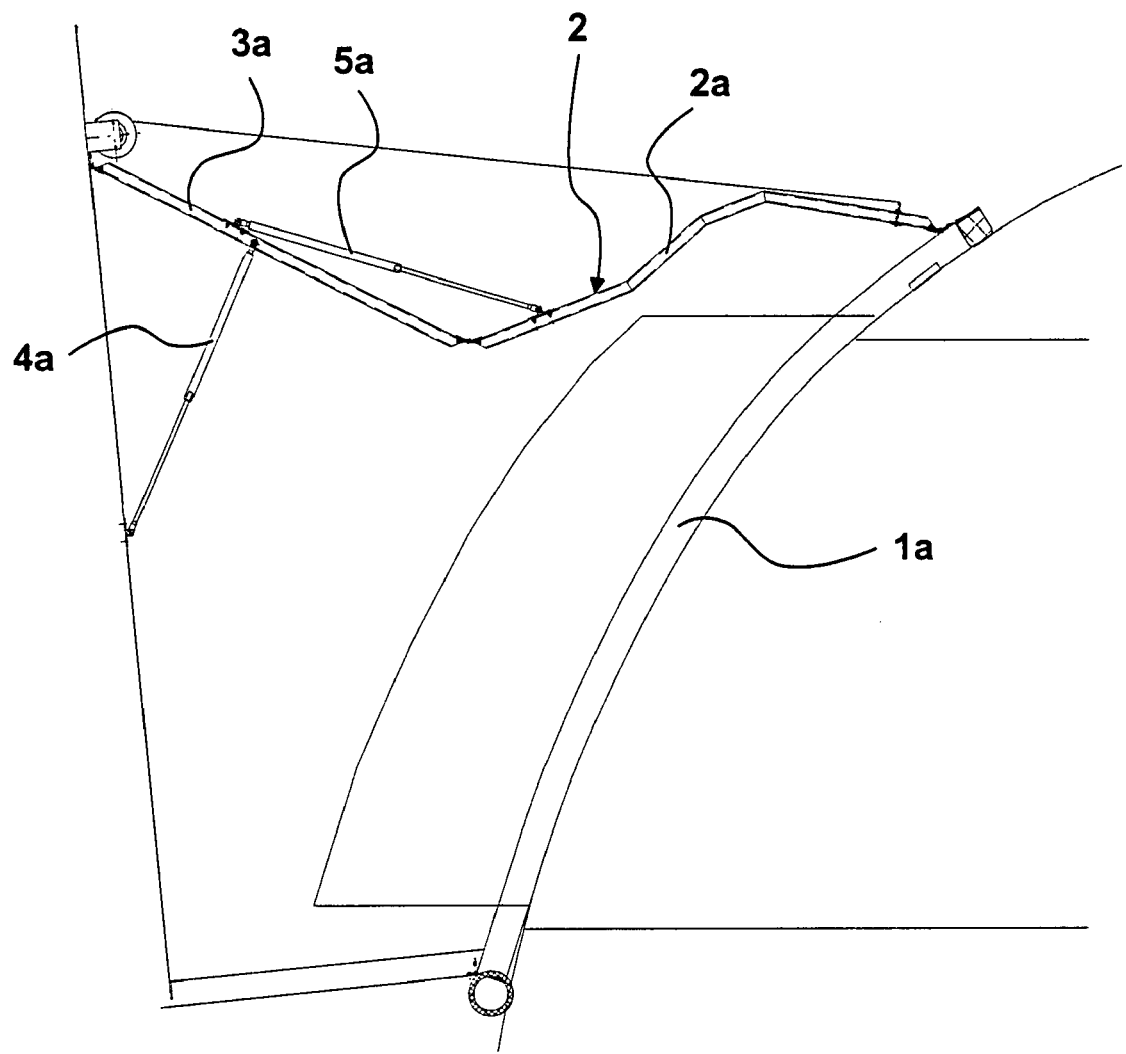
FIGS. 1a and 1b schematically show the problem of fitting the bellows with the shock buffer to an aircraft having a large diameter fuselage (FIG. 1a) and to an aircraft having a small diameter fuselage (FIG. 1b)
Figure 1B:
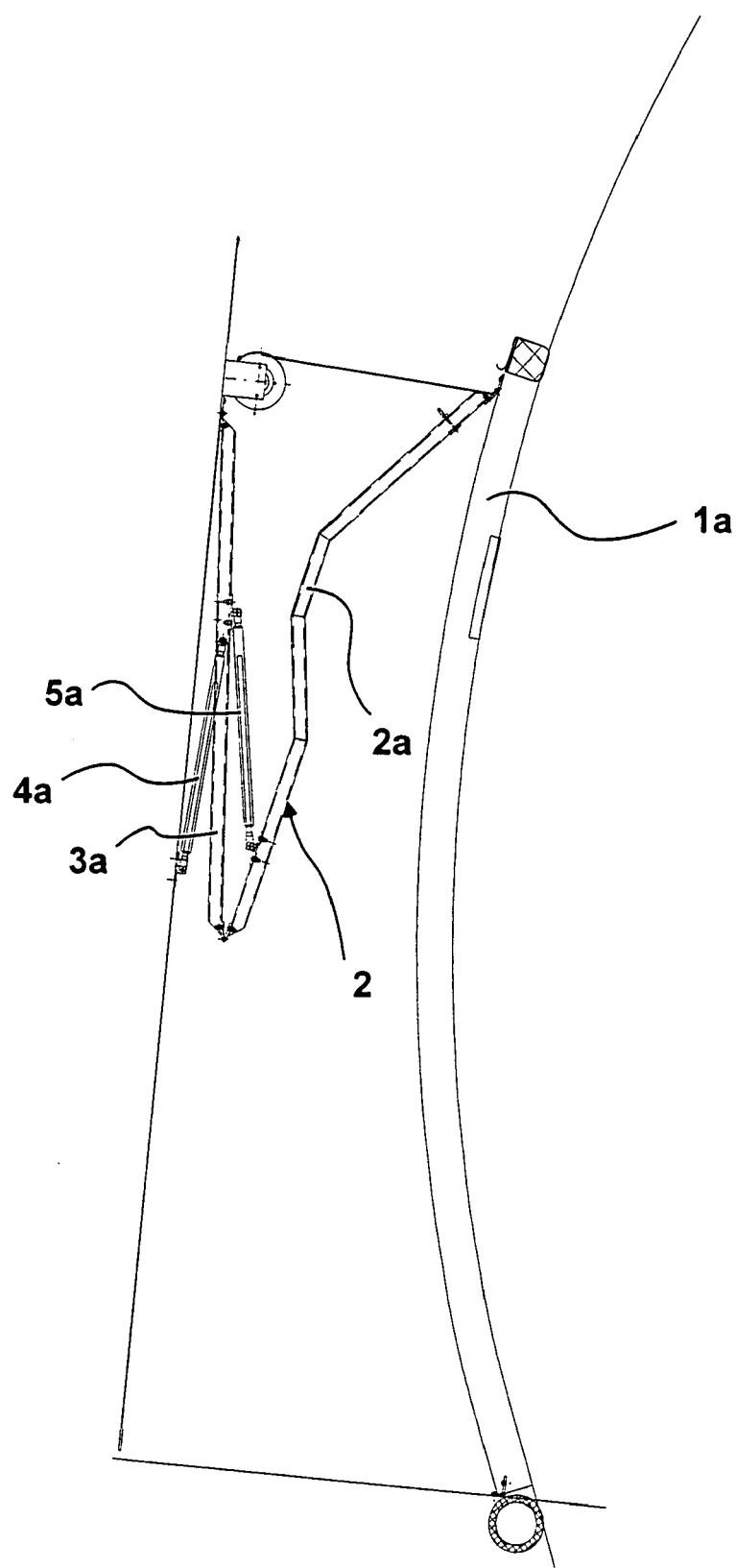

FIGS. 1a and 1b schematically show the bellows fitting, at its shock buffer disposed on the end side thereof, against a large diameter aircraft fuselage, the door opening being located far in the roof (FIG. 1a) as well as the bellows fitting, at its shock buffer, against a smaller diameter aircraft fuselage, with the door opening being located in the vertical region of the aircraft fuselage.. It appears directly therefrom that, when the pleated bellows is fit at its shock buffer disposed on the end side thereof against a large diameter aircraft fuselage, the height dimension of the bellows must be larger than when the bellows is fit against a smaller diameter aircraft fuselage. If a bellows with a large clear width opening were to be fit against a small aircraft fuselage in the region of the shock buffer, there would be the risk that the shock buffer projects beyond the zenith of the aircraft fuselage with all the consequences described herein above.

Figure 2:
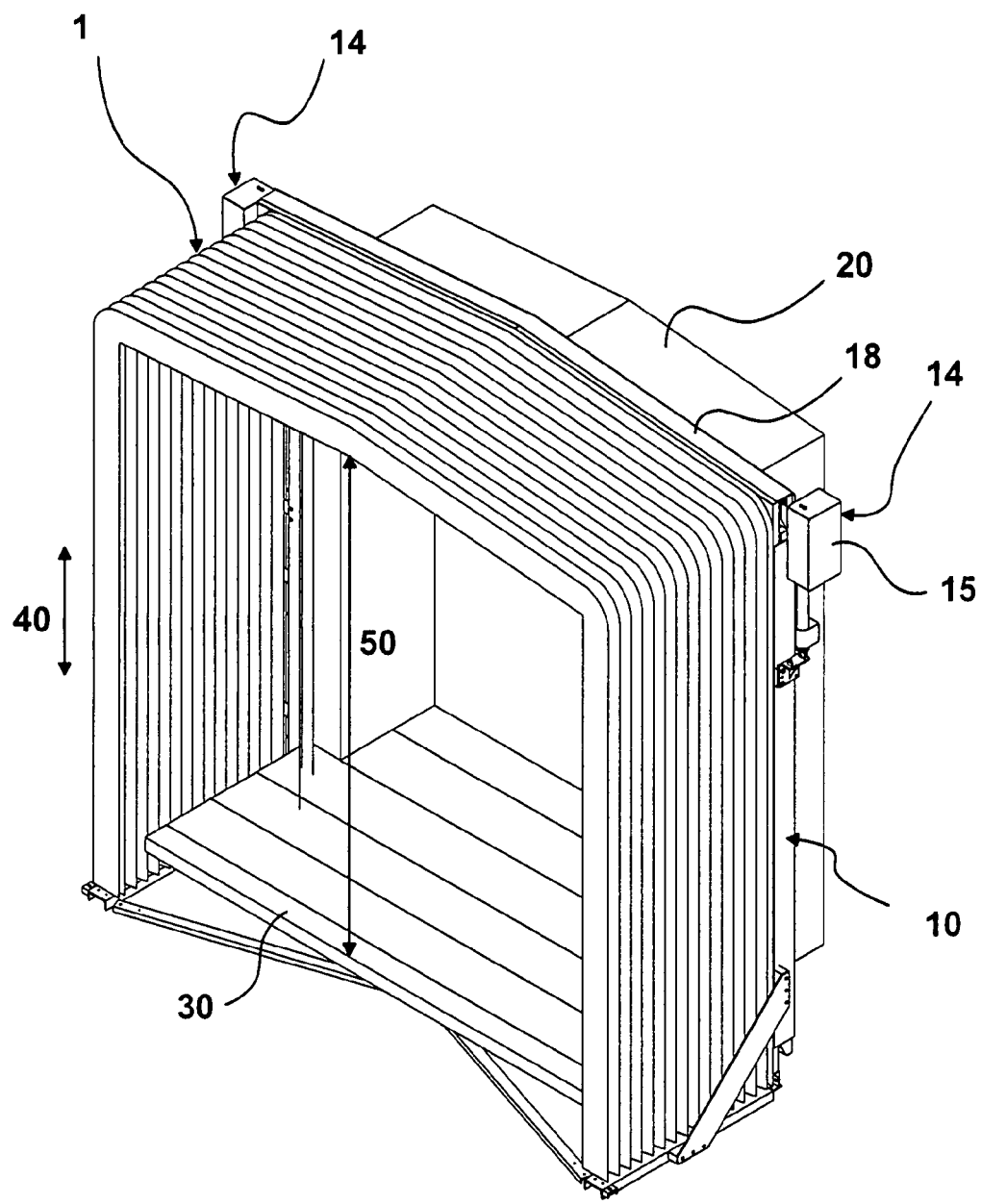
FIG. 2 schematically shows the front part of aircraft boarding stairs or of an aircraft boarding bridge in a perspective representation.
Figure 3:
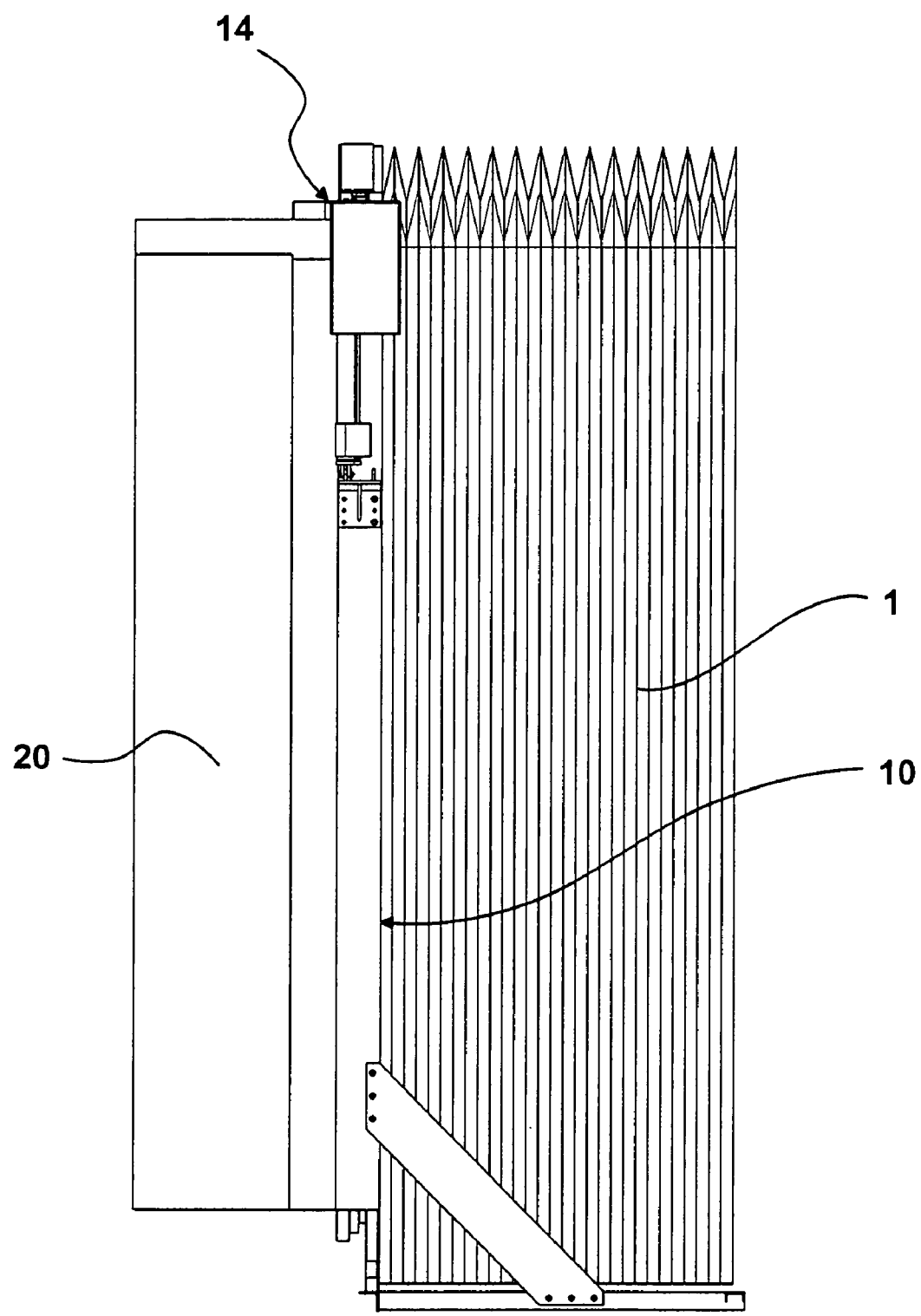
FIG. 3 shows a side view according to FIG. 2.
Figure 4:
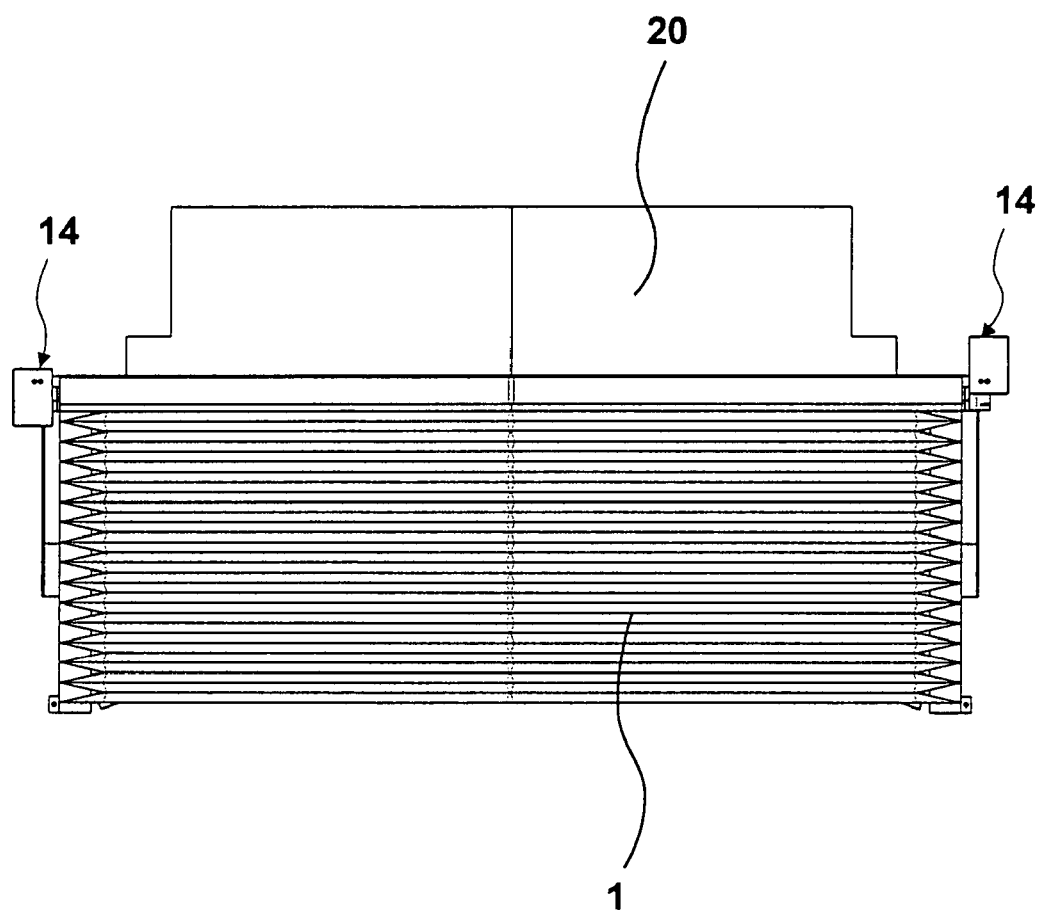
FIG. 4 shows a view according to FIG. 2.
Figure 9:
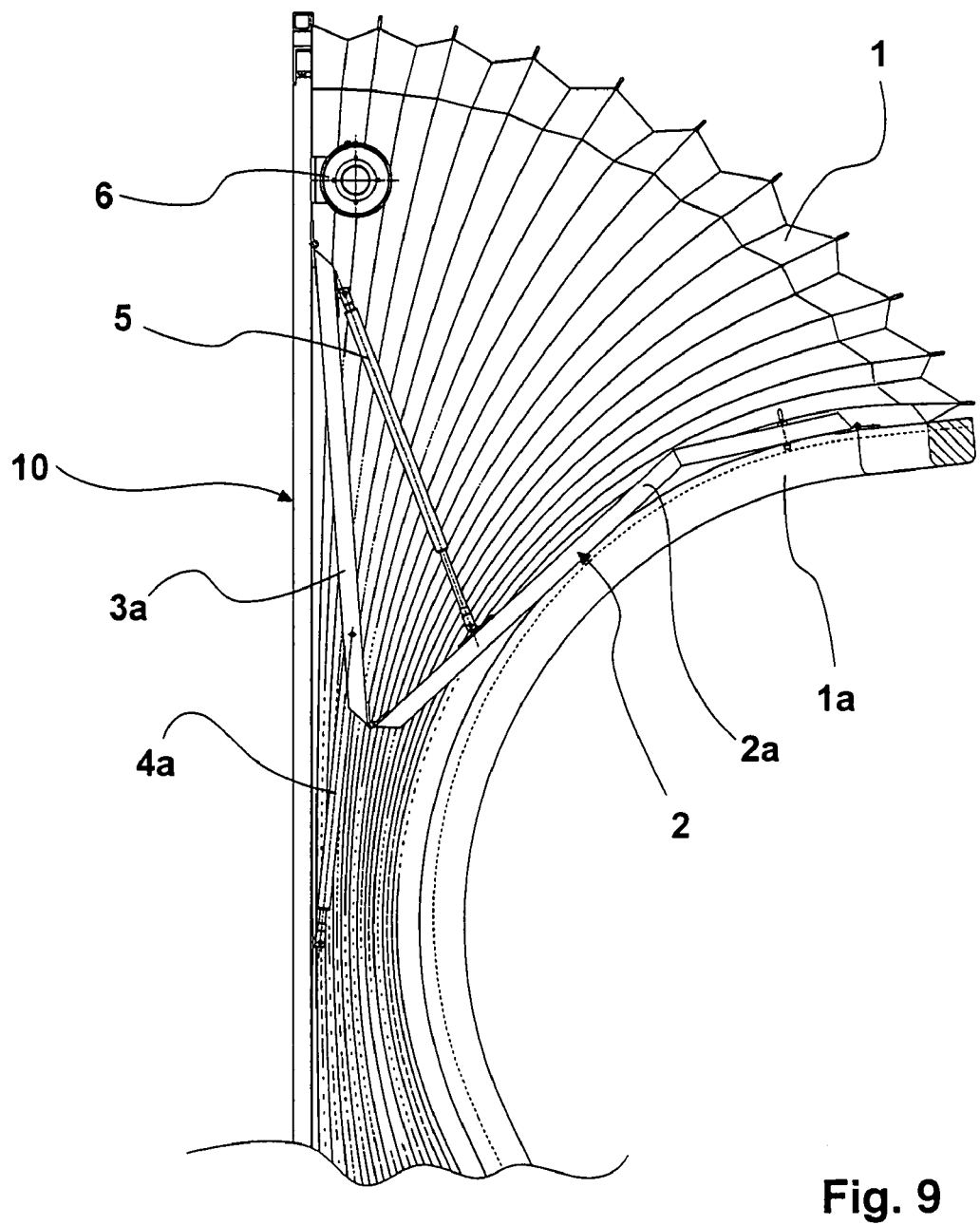
FIG. 9 schematically shows the upper region of the bellows with the arms for adjusting the bellows.

The front part of an aircraft boarding bridge or stairs can be seen from the perspective illustration in FIG. 2, said front part including the bellows 1 that is connected to the housing 20 of the aircraft boarding bridge or stairs through the frame apparatus 10. The bellows 1 is stretched over the gangway bottom plate indicated at 30. The bottom plate may hereby be configured to be made from lamellae so that the bottom may be contracted or expanded according to the bellows 1. FIG. 9 in particular shows how to expand the bellows 1, an arm 2 being especially formed for this purpose, which consists of two arm parts 2a and 3a that are linked together, the arm parts ensuring that the bellows fits against the aircraft fuselage via piston-and-cylinder drives 4a, 5a together with a cable guide 6. On the end side of the bellows 1 there is located a shock buffer 1a that is removed in FIG. 2 for the sake of clarity. The bottom 30 is not connected to the bellows 1.

Figure 8:
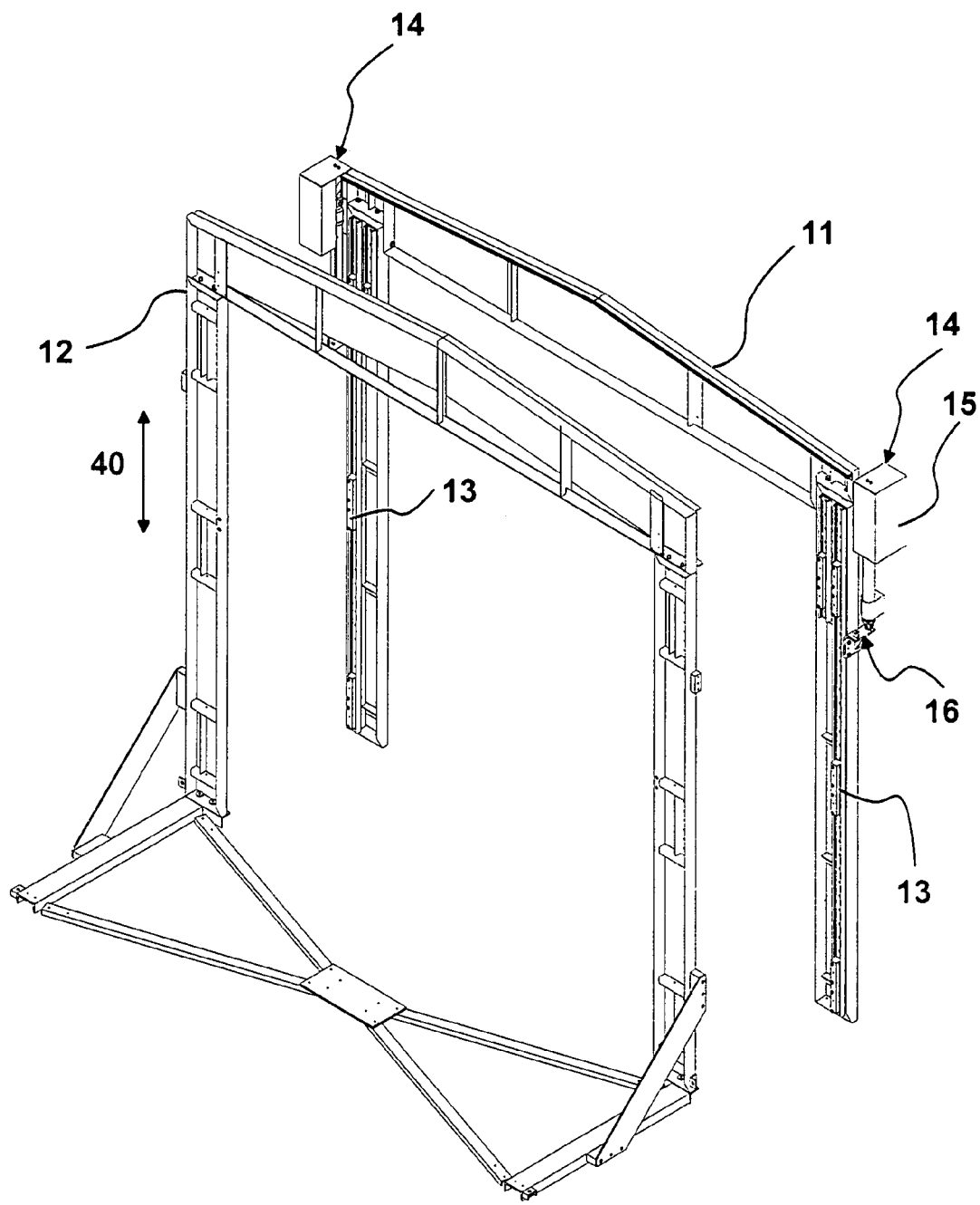
FIG. 8 shows the two frame parts of the aircraft boarding stairs or of the aircraft boarding bridge in an exploded view, the bellows and also the connection of the stairs or the bridge on the end side being removed for clarity.

The subject matter of the invention now is how to vertically move the bellows 1, which, as can be seen from FIG. 2, projects downward beyond the bottom 30, pursuant to arrow 40 in order to vary the clear width of the opening, indicated by the arrow 50. In order to relatively displace the bellows 1 in height out of the housing 20 of the aircraft boarding stairs or bridge, there is provided what is referred to as a frame apparatus 10, the configuration of said frame apparatus 10 being particularly obvious from FIG. 8. FIG. 8 shows the two frame parts 11 and 12 that are relatively movable in the vertical direction through the so-called Rollon® guides 13. For displacing the two frame parts 11 and 12 relative to each other, there is provided a drive, which is indicated generally at 14, on either side of the frame part 11, said drive 14 being shown as a spindle drive. The drive motor 15 of the spindle drive 14 is disposed on the frame part 11, said spindle having on its end side a catch 16 for connection with the frame part 12. This means that, upon actuation of the drive 14, the frame part 12 is movable in the vertical direction pursuant to the arrow 40 so that the bellows increases or reduces the vertical distance from the bottom.

Figure 5:
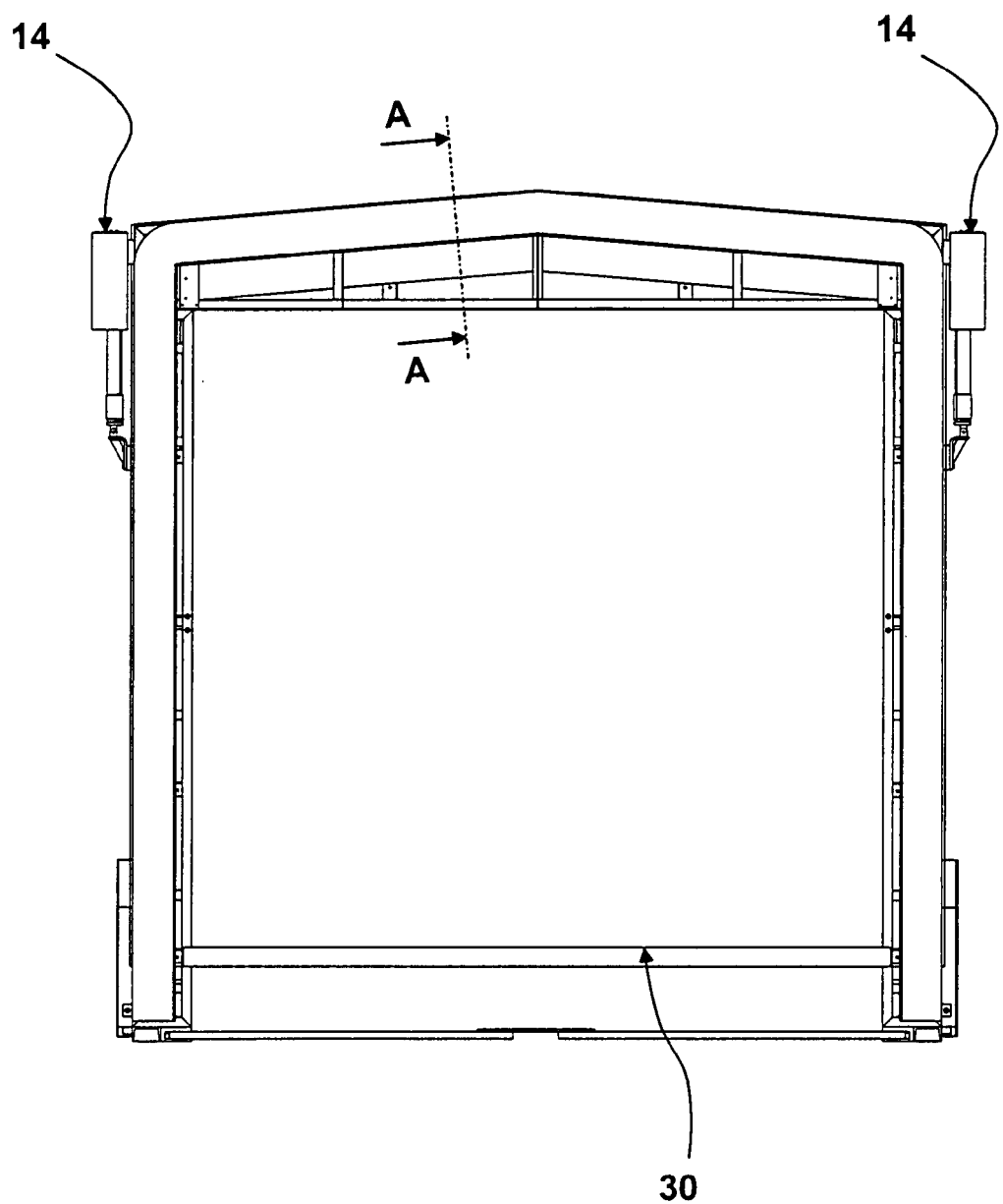
FIG. 5 shows a front view of the frame apparatus.
Figure 6:
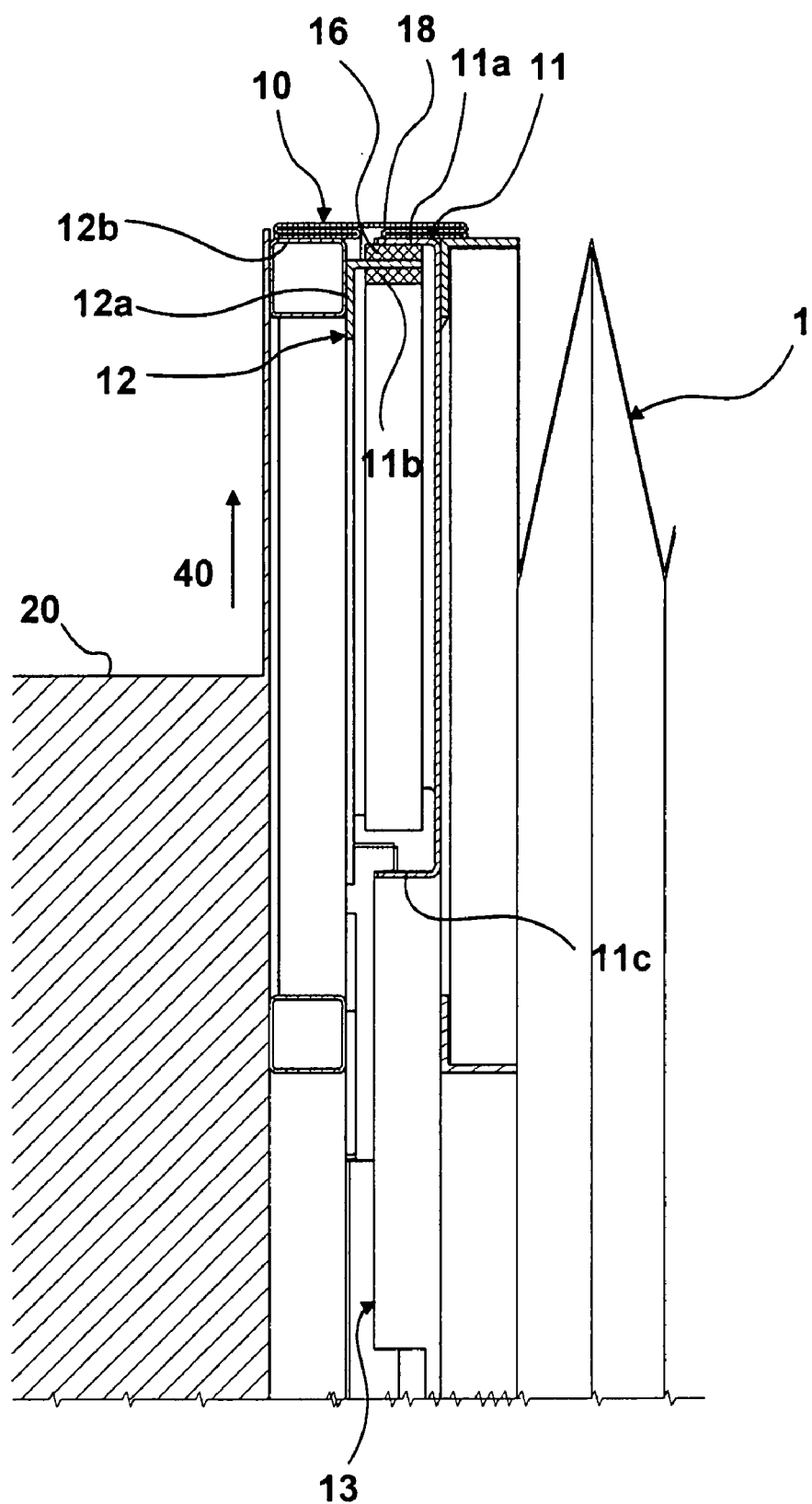
FIG. 6 shows the bellows of the aircraft boarding stairs or of the aircraft boarding bridge in the retracted position in a side view on an enlarged scale, the drive having been removed for increased clarity, along the section line A-A in FIG. 5.
Figure 7:
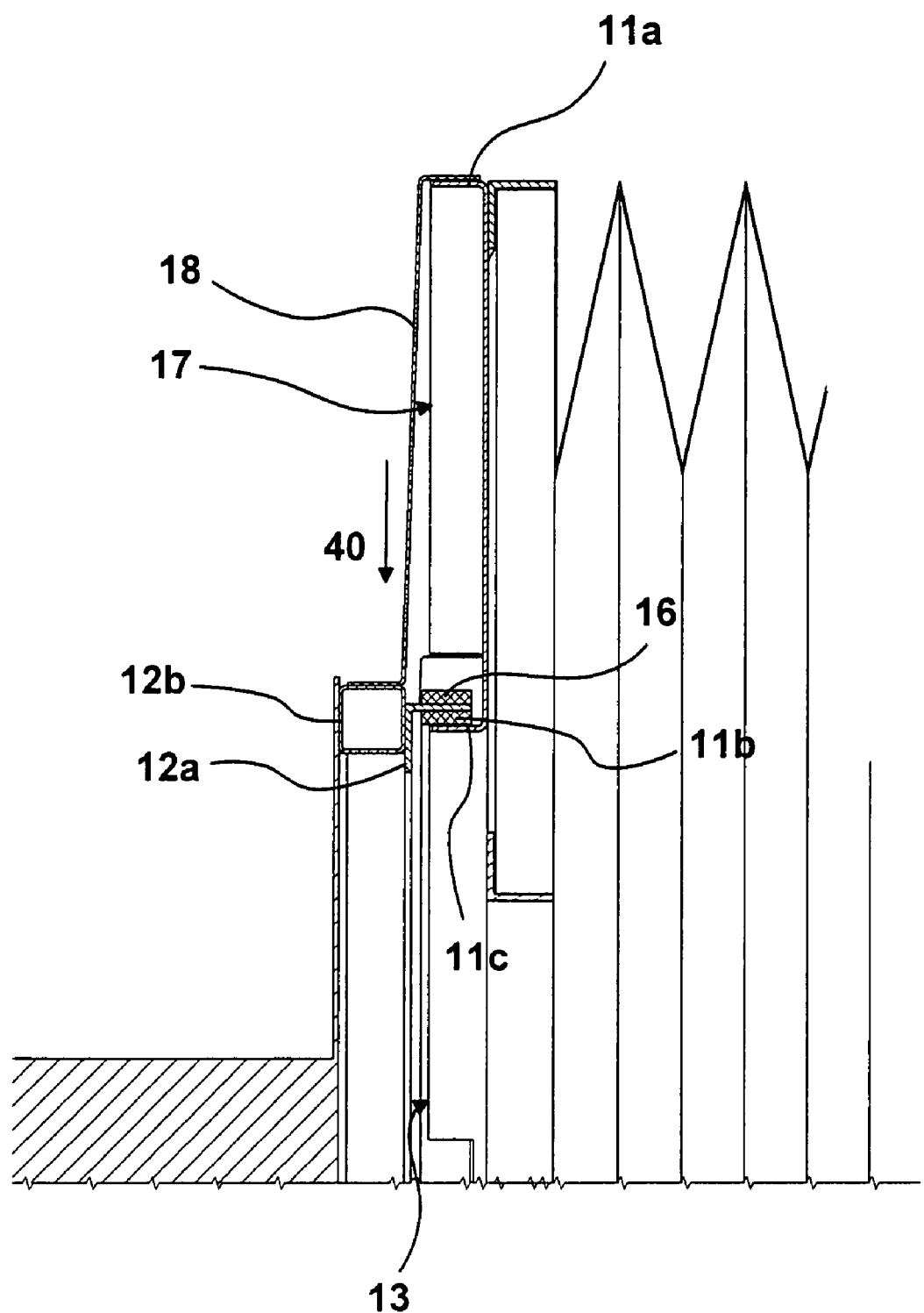
FIG. 7 shows an illustration according to FIG. 5, in which the bellows is deployed upward, that is to say that it has adopted an upper end position, along the section line A-A in FIG. 5.

Referring now to the FIGS. 6 and 7, which are sectional views along A-A in FIG. 5, one can see two relative positions of the frame elements 11 and 12. In the illustration shown in FIG. 6, the two frame parts 11 and 12 are almost in one plane, i.e., the two frame parts adopt a bottom end position relative to each other. The two frame parts 11 and 12 hereby possess at their upper end an angle 11a, 12a, said angle 12a being disposed on a frame tube 12b of the frame part 12. Between the angle 12a and the angle 11a there is located a seal 16, e.g. a cellular rubber, for sealing. As already mentioned, FIG. 6 represents the bottom end position.

In the top end position shown in FIG. 7, the frame element 12 is displaced pursuant to arrow 40, the angle 12a then adopting a position in which this angle 12a fits above the seal 11b of the other leg 11c of the frame 11. In order to prevent moisture from penetrating into the thus forming clearance 17, there is provided the ceiling cloth 18, which covers this opening, as can be best seen from FIG. 7. In the upper end position shown in FIG. 7, the passage has the greatest clear height between the upper edge of the gangway bottom plate and the inner edge of the bellows ceiling.

Figure 10:
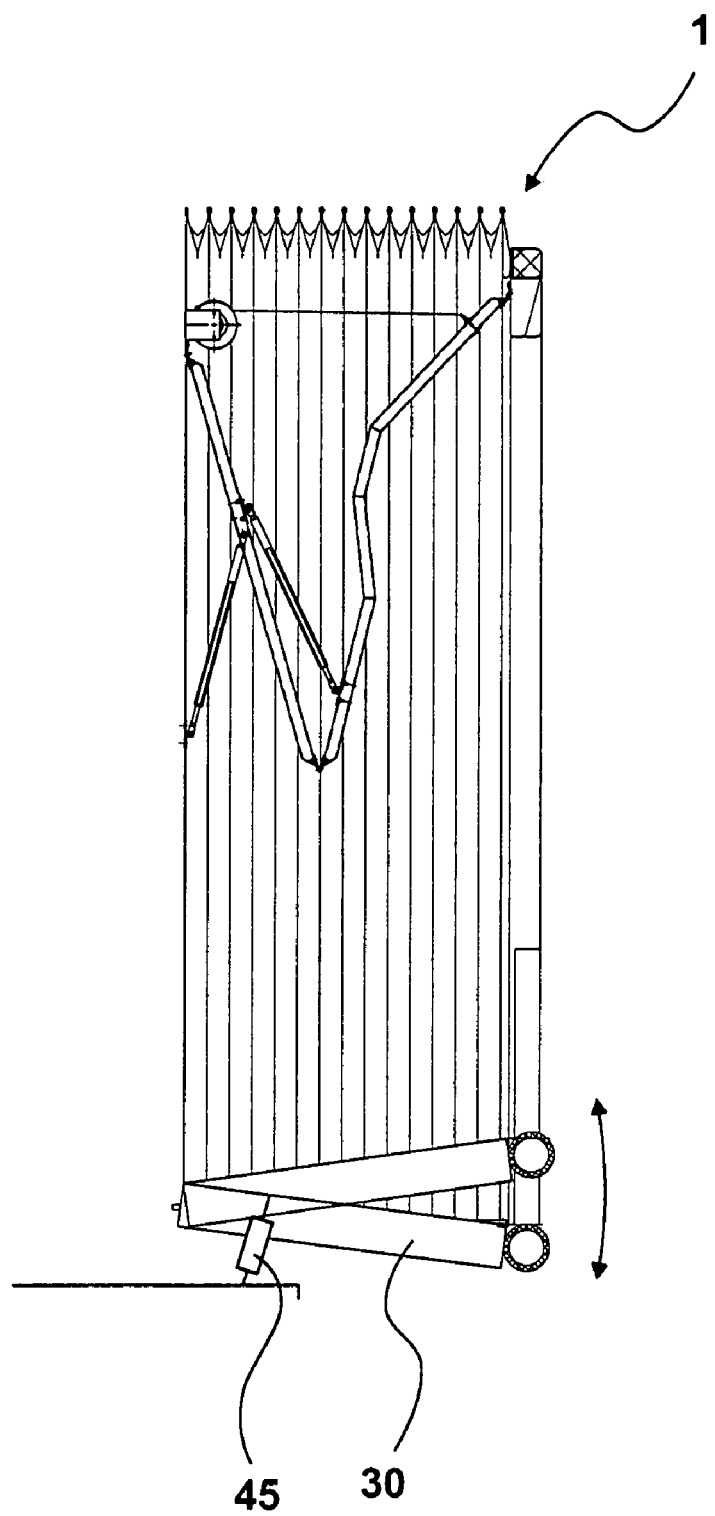
FIG. 10 shows an embodiment of an aircraft boarding bridge with pivotal gangway bottom plate.

The subject matter of the FIGS. 10, 11a and 11b is the configuration of a height-adjustable gangway bottom plate 30, said gangway bottom plate 30 being configured to be pivotal in accordance with FIG. 10 in order to bridge different heights when boarding an aircraft using the aircraft boarding bridge. A drive, for example a piston-and-cylinder drive 45, may be provided for pivoting the gangway bottom plate 30. Another embodiment as it can be seen from the FIGS. 11a and 11b is characterized by a substantially vertically height-adjustable gangway bottom plate 30, the connection between the gangway bottom plate 30 and the actual aircraft boarding bridge occurring through a receiving beam 46, the connection between the gangway bottom plate 40 and the beam 46 occurring through a guide rail (FIG. 11c) that is configured like a dovetail guide 47. A piston-and-cylinder drive 45 is provided for vertical adjustment of the gangway bottom plate 40.

We claim:

1. An aircraft boarding bridge or aircraft boarding stairs with a gangway bottom plate (30), said aircraft boarding bridge or said aircraft boarding stairs comprising a generally U-shaped bellows, that spans said gangway bottom plate characterized in that the aircraft boarding stairs or the aircraft boarding bridge comprises a frame apparatus that receives the bellows (1) for height adjustment of the bellows relative to the gangway bottom plate (10) so that a height between an upper edge of the gangway bottom plate (30) and a roof of the bellows (1) may be changed and the frame apparatus comprises two relatively movable generally inverted U-shaped frame parts (11, 12) which are connected together through generally vertically extending longitudinal linear bearing guides (13) and which are juxtaposed to each other and which are movable vertically relative to each other in a non-telescoping manner, the bellows having a shock buffer (1a) which is connected to an arm to expand the bellows through a linkage and telescoping members to ensure that the bellows fits against the aircraft fuselage.

2. The aircraft boarding bridge or aircraft boarding stairs as set forth in claim 1, characterized in that the one frame part (11, 12) is movable relative to the other frame part (11, 12) through a motor drive (14).

3. The aircraft boarding bridge or aircraft boarding stairs as set forth in claim 2, characterized in that the motor drive is configured to be a spindle drive (14).

4. The aircraft boarding bridge or aircraft boarding stairs as set forth in 1, characterized in that the two frame parts (11, 12) are connected together with a ceiling cloth (18).

5. The aircraft boarding bridge or aircraft boarding stairs as set forth in claim 1, characterized in that the gangway bottom plate (30) is height adjustable.

6. The aircraft boarding bridge or aircraft boarding stairs as set forth in claim 5, characterized in that the gangway bottom plate (30) is adapted to be pivotally received by the aircraft boarding bridge.

7. The aircraft boarding bridge or aircraft boarding stairs as set forth in claim 5, characterized in that the gangway bottom plate (30) is adapted to be received for vertical displacement by the aircraft boarding bridge.

8. The aircraft boarding bridge as set forth in claim 6, characterized in that the position of the gangway bottom plate (30) may be changed by means of a drive including a piston-and-cylinder drive (45).

9. The aircraft boarding bridge or aircraft boarding stairs as set forth in claim 7, characterized in that the gangway bottom plate (30) is retained for vertical displacement by a receiving beam (46).

10. The aircraft boarding bridge or aircraft boarding stairs as set forth in claim 9, characterized in that a dovetail type guide (47), is provided for connecting the gangway bottom plate (30) to the receiving beam (46).

* * * * *